(12) United States Patent
Stamenkovic

(10) Patent No.: US 6,715,342 B2
(45) Date of Patent: *Apr. 6, 2004

(54) PNEUMATIC LENGTH MEASUREMENT APPARATUS

(75) Inventor: Milan Stamenkovic, Gerlingen (DE)

(73) Assignee: Stotz Feinmesstechnik GmbH, Gerlingen (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/451,490

(22) Filed: Nov. 30, 1999

(65) Prior Publication Data

US 2003/0110831 A1 Jun. 19, 2003

(30) Foreign Application Priority Data

Apr. 28, 1999 (DE) .................................... 299 07 567 U

(51) Int. Cl.[7] .......................... G01B 13/08; G01C 25/00
(52) U.S. Cl. ........................... 73/37.5; 73/1.81; 702/97
(58) Field of Search ................. 73/37.5, 1.81, 73/1.57; 702/97

(56) References Cited

U.S. PATENT DOCUMENTS

| | | | |
|---|---|---|---|
| 1,883,522 A | * 10/1932 | Breer | .......................... 73/37.5 |
| 4,854,156 A | 8/1989 | Hoeffel et al. | |

FOREIGN PATENT DOCUMENTS

| | | | | |
|---|---|---|---|---|
| CH | 364904 | | 10/1962 | |
| DE | 2921989 | * | 5/1979 | |
| DE | 2921989 | | 12/1980 | |
| DE | 4200401 | * | 1/1992 | .................. 73/105 |
| DE | 19733984 | | 2/1994 | |
| DE | 4344264 | | 6/1994 | |
| JP | 0153207 | * | 9/1982 | .................. 73/37.5 |
| WO | 99/08069 | * | 2/1999 | |

* cited by examiner

*Primary Examiner*—Michael Cygan
(74) *Attorney, Agent, or Firm*—Townsend and Townsend and Crew, LLP

(57) ABSTRACT

The present invention relates to an apparatus for pneumatic length measurement comprising a pre-nozzle and a measurement nozzle through which the medium used for the measurement is directed onto an impact plate, a first pressure sensor arranged in front of the pre-nozzle, a second pressure sensor arranged between pre-nozzle and measurement nozzle, means for the determination of the distance of the impact plate from the measurement nozzle from the change of the pressure between pre-nozzle and measurement nozzle taking account of the pressure measured by the first pressure sensor and means for the calibration of the apparatus in a given measurement range, wherein, in order to ease the calibration, the calibration means operate with a calibration function which is constructed on the assumption of constancy of the outflow number of the pre-nozzle and of the outflow number of the measurement nozzle.

5 Claims, 1 Drawing Sheet

PNEUMATIC LENGTH MEASUREMENT APPARATUS

BACKGROUND OF THE INVENTION

1. Field of the Invention

The present invention relates to an apparatus for pneumatic length measurement comprising a pre-nozzle and a measurement nozzle through which the medium used for the measurement is directed onto an impact plate, a first pressure sensor arranged in front of the pre-nozzle, a second pressure sensor arranged between pre-nozzle and measurement nozzle, means for the determination of the distance of the impact plate from the measurement nozzle from the change of the pressure between pre-nozzle and measurement nozzle taking account of the pressure measured by the first pressure sensor and means for the calibration of the apparatus in a given measurement range.

2. Description of the Prior Art

An apparatus of this kind is known from DE 197 33 984.0. There, an apparatus is described in conjunction with a pneumatic high pressure length measuring method which operates with only two nozzles instead of the known bridge circuits. Through the use of a pressure sensor in front of the pre-nozzle it is possible to dispense with the two further nozzles of the reference branch in the bridge circuit. The air consumption associated with the reference branch is thus avoided.

For the calibration of the known apparatus various calibration formulae are named in DE 197 33 984.0. All require a value measurement at two different fixed lengths. That is to say, two setting masters are required in order to calibrate the apparatus and to determine the measurement function.

SUMMARY OF THE INVENTION

The present invention is based on the object of setting forth an apparatus of the initially named kind which is easier to calibrate.

This object is satisfied in that the calibration means operates with a calibration function which is constructed on the assumption of constancy of the outflow number of the pre-nozzle and of the outflow number of the measurement nozzle.

Through the use of such a calibration function the calibration is simplified. The use of a calibration function is which is additionally constructed on the assumption of constant diameter of the pre-nozzle and of the measurement nozzle is particularly preferred. In this way a calibration function can be used with only one constant for the calibration of the apparatus. Since only one constant has to be determined, the measurement at one fixed preset length value is sufficient for the calibration. That is to say, only one setting master is required in order to carry out the calibration. Accordingly, the calibration for the apparatus of the invention can thus take place simply and rapidly.

A calibration function of this kind, that is to say the calibration method used in the initially described apparatus, can also be used in all pneumatic length measurement apparatuses, and thus also in length measurement apparatuses which operate with a bridge circuit, or also with low pressure length measurement apparatuses. In this connection the invention is based on the recognition that the supply pressure and the temperature are essentially constant when using these apparatuses, and thus also the outflow numbers and the diameter of the pre-nozzle and measurement nozzle, so that a calibration function constructed under these assumptions, which is correspondingly simple, delivers usable results.

In accordance with a design of the invention the apparatus is designed for high pressure measurement methods, i.e. supply pressures greater than 2 bar, in particular circa 3 bar. In this respect it has proved to be suitable when the calibration means use the function $$x = C\frac{p_1}{p_2}\sqrt{\left(\frac{p_2}{p_1}\right)^{\frac{2}{\kappa}} - \left(\frac{p_2}{p_1}\right)^{\frac{\kappa+1}{\kappa}}}$$

as the calibration function, with $\kappa$ being the adiabatic constant of the medium used for the measurement and C being a constant. The constant C can easily be determined with only one setting master of the length $X_2$ in accordance with the following formulae:

$$C = X_2 \frac{P_2}{P_1\sqrt{\left(\frac{P_2}{P_1}\right)^{1.42857} - \left(\frac{P_2}{P_1}\right)^{1.71429}}}$$

with $P_1$ being the magnitude of the supply pressure $p_1$ during calibration and $P_2$ being the pressure $p_2$ measured with the inserted setting master $X_2$. As has been shown, very small deviations over the full measurement range can be achieved with this calibration function. The calibrated measurement range can indeed be enlarged in comparison to apparatuses of which the calibration means operate with known calibration functions. Moreover, measurement nozzles of different diameters can be used advantageously, since the sensitivity is automatically co-calibrated.

In accordance with a further design of the invention, the calibration means can use the function:

$$x = \sqrt{\frac{\frac{p_1}{p_2} - 1}{B}}$$

as the calibration function, with B being a constant. This is a relatively simple calibration function which exploits the non-linear relationship between $p_2$ and $p_1$. The constant B can be determined as follows with a single setting master $X_2$:

$$B = \frac{1}{X_2^2}\left(\frac{P_1}{P_2} - 1\right)$$

with $P_1$ again being the magnitude of the supply pressure $p_1$ during calibration and $P_2$ again being the measured pressure $p_2$ with the inserted setting master $X_2$. This design also has the advantage of a large calibrateable range of measurement. Moreover, the ability to use measurement nozzles with different diameters also applies here, since the sensitivity is automatically co-calibrated.

DESCRIPTION OF THE PREFERRED EXEMPLARY EMBODIMENTS

Figure 1:
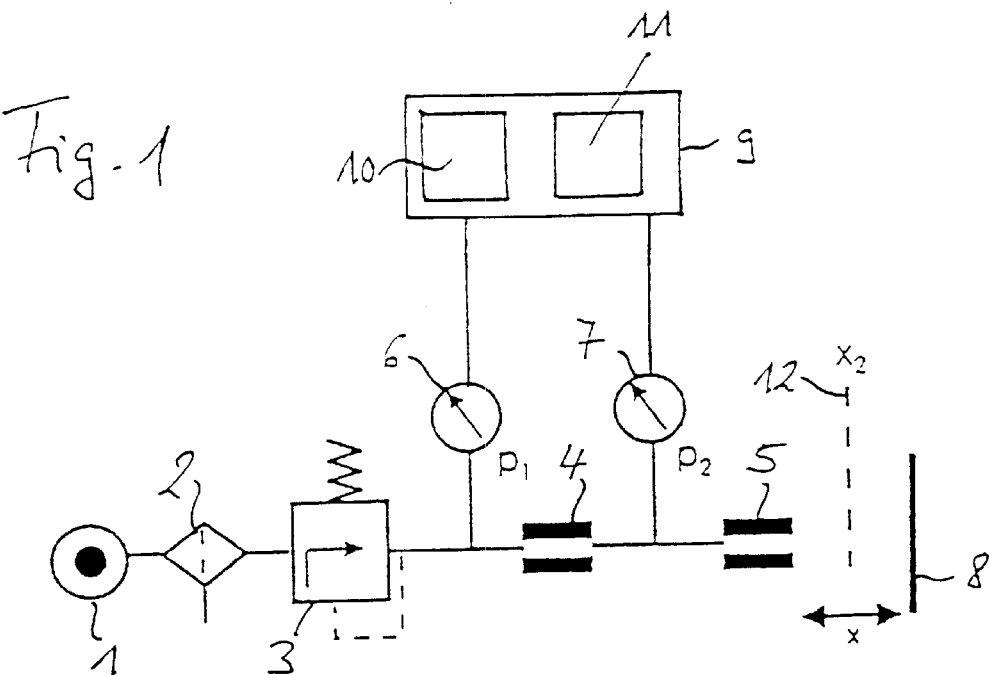
FIG. 1 is a measurement apparatus in accordance with the invention.

The measurement apparatus shown in FIG. 1 comprises a pressure source 1, a filter 2, a pressure regulator 3, a pre-nozzle 4, a measurement nozzle 5, a first pressure sensor 6 arranged before the pre-nozzle 4, and a second pressure sensor 7 arranged between pre-nozzle 4 and measurement nozzle 5. An impact plate 8 representing a workpiece to be measured is shown in front of the air outlet opening of the measurement nozzle 5.

The two pressure sensors 6 and 7 stand in connection with an evaluation unit 9 which include both means 10 for the determination of the distance of the impact plate 8 from the measurement nozzle 5 and means 11 for the calibration of the apparatus. These means 10 and 11 are only very schematically shown here as a block. A distance $X_2$ is also drawn in with an interrupted line 12 between the impact plate and the measurement nozzle 5 and corresponds to the distance which is determined by the setting master used for the calibration.

The illustrated apparatus is subjected via the pressure source 1 and the pressure regulator 3 to a substantially constant air pressure which is measured by the pressure sensors 6 and 7 in front of the pre-nozzle 4 and in front of the measurement nozzle 5. The pressure drop at the measurement nozzle 5 changes according to the distance of the impact plate 8 from the measurement nozzle 5 and thus depends on the pressure value $p_2$ measured in front of the measurement nozzle 5 by the pressure sensor 7. The so obtained crude measurement value $p_2$ is corrected by the pressure value $p_1$ measured in front of the pre-nozzle 4 by the first pressure sensor 6 so that fluctuations in the supply air pressure can be compensated. For example the correction can take place in accordance with the formula:

$$f(p_1, p_2) = \alpha p_1 - p_2$$

with $\alpha$ being a basically freely selectable constant. More precise, correction functions are described in DE 197 33 984.0. Thus, a good pneumatic length measurement which operates precisely is made possible without a reference branch.

For the calibration of the apparatus a length measurement is carried out using a setting master which specifies a fixed predetermined length $X_2$. The calibration is based on the following equation for the distance x:

$$x = \frac{D_{Z1}^2}{4 D_{Z2}} \frac{\alpha_1}{\alpha_2} \frac{p_1}{p_2} \sqrt{\left(\frac{p_2}{p_1}\right)^{\frac{2}{\kappa}} - \left(\frac{p_2}{p_1}\right)^{\frac{\kappa+1}{\kappa}}}$$

In this, $\kappa$ is the adiabatic constant, i.e. 1.4 in the case of air, $D_{Z1}$ is the diameter of the pre-nozzle 4, $D_{Z2}$ is the diameter of the measurement nozzle 5, $\alpha_1$ the outflow number of the pre-nozzle 4 and $\alpha_2$ the outflow number of the measurement nozzle 5. If one assumes constant temperature then the nozzle diameters $D_{Z1}$ and $D_{Z2}$ become constants. Likewise, the outflow numbers $\alpha_1$ and $\alpha_2$ are constant at constant supply-pressure $p_1$. With this assumption, the above equation can be simplified to:

$$x = C \frac{p_1}{p_2} \sqrt{\left(\frac{p_2}{p_1}\right)^{1.42857} - \left(\frac{p_2}{p_1}\right)^{1.71429}}$$

when the adiabatic constant of air is inserted. The constant C can now be determined using the setting master with the fixed length $X_2$:

$$C = X_2 \frac{P_2}{P_1 \sqrt{\left(\frac{P_2}{P_1}\right)^{1.42857} - \left(\frac{P_2}{P_1}\right)^{1.71429}}}$$

wherein $P_1$ is the magnitude of the supply pressure $p_1$ during the calibration and $P_2$ is the pressure $p_2$ measured with the inserted setting master with the fixed length $X_2$.

Alternatively, the following non-linear relationship between $p_1$ and $p_2$ can be used as the calibration equation:

$$p_2 = \frac{p_1}{1 + Bx^2}$$

The constant B can be found with the same setting master of the length $X_2$ in accordance with the following formula:

$$B = \frac{1}{X_2^2} \left( \frac{P_1}{P_2} - 1 \right)$$

wherein $P_1$ and $P_2$ have the same meaning as previously. Thus, $$x = \sqrt{\frac{\frac{p_1}{p_2} - 1}{B}}$$

results for the distance x.

Figure 2:
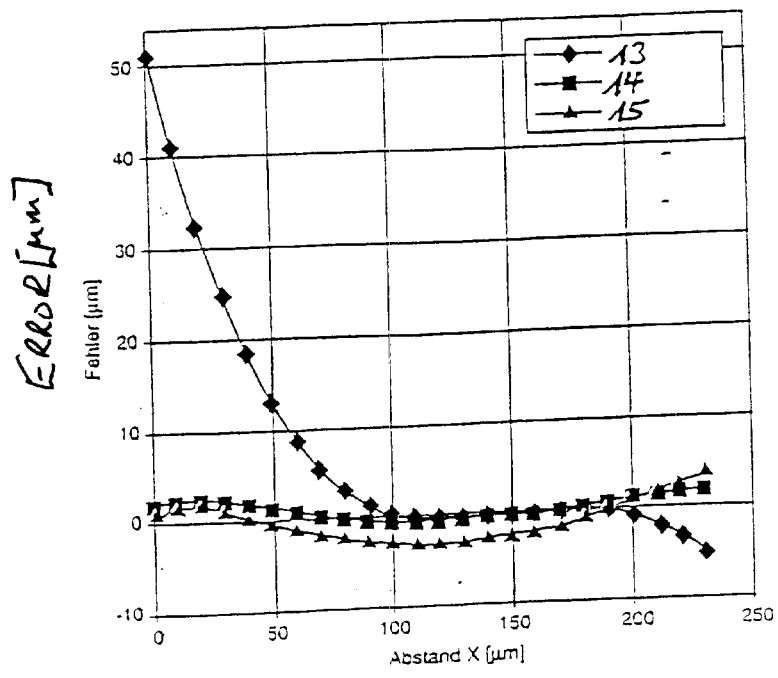
FIG. 2 is a representation of the error resulting from the calibration.

Since only one setting master has to be used, the calibrations can be carried out rapidly and simply. Despite this, the error caused by the calibration is not greater than when using two setting masters and linear calibration. As shown in FIG. 2.

Curve 13 in FIG. 2 shows the error with linear calibration with two setting masters in a bridge circuit in accordance with the formulae:

$$x(\delta) = E \cdot \delta + B,$$

wherein $\delta = p_2 - p_3$ signifies the difference between the two branches of the bridge circuit and E and B signify constants.

Curve 14, in FIG. 2, shows the error when using the first calibration equation of the present invention and curve 15 the error for the second calibration equation of the present invention.

One recognizes that the error when using the calibration equations of the invention over the full measurement range, that is to say from zero up to circa 250 μm is very low and in particular is not larger than this in the range of the linear calibration between 100 μm and 180 μm. A significantly larger measurement range can thus be achieved with the calibration in accordance with the invention.

The invention is based in this respect on the basic concept of regarding the unknown parameters in the equation for the distance to be measured between the impact plate and the measurement nozzle, such as the diameter and outflow number of the measurement nozzle and pre-nozzle, as constant and of determining the value of the constants by one setting master. If all unknown parameters are replaced by a single constant, then a measurement with one setting master is sufficient in order to determine the constant. This method can basically also be used in high pressure measurement methods with bridge circuits and in low pressure measurement methods.

REFERENCE NUMERAL LIST 1 pressure source
2 air filter
3 pressure regulator
4 pre-nozzle
5 measurement nozzle
6 first pressure sensor
7 second pressure sensor
8 impact plate
9 evaluation unit
10 distance determining means
11 calibration means
12 distance of the setting master
13 curve of the linear calibration
14 curve of the first non-linear calibration
15 curve of the second non-linear calibration

What is claimed is:

1. An apparatus for pneumatic length measurement comprising:

a pre-nozzle;

a measurement nozzle through which the medium used for the measurement is directed onto an impact plate;

a first pressure sensor arranged in front of the pre-nozzle;

a second pressure sensor arranged between the pre-nozzle and the measurement nozzle;

means for determining the distance of the impact plate from the measurement nozzle based on the change in pressure ($p_2$) between the pre-nozzle and the measurement nozzle while accounting for the pressure ($P_1$) measured by the first pressure sensor; and means for determining the scale of the apparatus in a given measurement range, wherein the means for determining the scale operates with a function which assumes that the outflow number ($\ddot{y}_1$) of the pre-nozzle and the outflow number ($\ddot{y}_2$) of the measurement nozzle remain constant, so that the function used to determine the scale of the apparatus can be used with only one constant;

wherein the calibration means uses the function $$x = \sqrt{\frac{\frac{p_1}{p_2} - 1}{B}}$$

as the calibration function, with B being a constant.

2. An apparatus in accordance with claim 1, wherein the calibration function further assumes that the diameter ($D_{Z1}$) of the pre-nozzle and the diameter ($D_{Z2}$) of the measurement nozzle remain constant.

3. An apparatus in accordance with claim 1, wherein the apparatus is designed for high pressure measurement methods having supply pressures greater than 2 bar.

4. An apparatus in accordance with claim 3, wherein the apparatus is designed for high pressure measurement methods having a supply pressure of 3 bar.

5. An apparatus for pneumatic length measurement comprising:

a pre-nozzle;

a measurement nozzle through which the medium used for the measurement is directed onto an impact plate;

a first pressure sensor arranged in front of the pre-nozzle;

a second pressure sensor arranged between the pre-nozzle and the measurement nozzle;

means for determining the distance of the impact plate from the measurement nozzle based on the change in pressure ($p_2$) between the pre-nozzle and the measurement nozzle while accounting for the pressure ($p_1$) measured by the first pressure sensor; and means for determining the scale of the apparatus in a given measurement range, wherein the means for determining the scale operates with a function which assumes that the outflow number ($\ddot{y}_1$) of the pre-nozzle and the outflow number ($\ddot{y}_2$) of the measurement nozzle remain constant, so that the function used to determine the scale of the apparatus can be used with only one constant;

wherein the calibration means uses the function $$x = C \frac{p_1}{p_2} \sqrt{\left(\frac{p_2}{p_1}\right)^{\frac{2}{\kappa}} - \left(\frac{p_2}{p_1}\right)^{\frac{\kappa+1}{\kappa}}}$$

as the calibration function, with κ being the adiabatic constant of the medium used for the measurement and C being a constant.

* * * * *